(12) United States Patent
Kitano

(10) Patent No.: US 10,652,491 B2
(45) Date of Patent: May 12, 2020

(54) SOLID-STATE IMAGING ELEMENT, DRIVING METHOD, AND ELECTRONIC DEVICE

(71) Applicant: SONY CORPORATION, Tokyo (JP)

(72) Inventor: Shin Kitano, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/065,487

(22) PCT Filed: Jan. 4, 2017

(86) PCT No.: PCT/JP2017/000008
§ 371 (c)(1),
(2) Date: Jun. 22, 2018

(87) PCT Pub. No.: WO2017/122550
PCT Pub. Date: Jul. 20, 2017

(65) Prior Publication Data
US 2018/0376094 A1 Dec. 27, 2018

(30) Foreign Application Priority Data

Jan. 14, 2016 (JP) .................. 2016-004904

(51) Int. Cl.
*H04N 5/374* (2011.01)
*H04N 5/357* (2011.01)
(Continued)

(52) U.S. Cl.
CPC ......... *H04N 5/3741* (2013.01); *H04N 5/3577* (2013.01); *H04N 5/376* (2013.01); *H04N 5/3745* (2013.01)

(58) Field of Classification Search
None
See application file for complete search history.

(56) References Cited

U.S. PATENT DOCUMENTS

2007/0046797 A1 3/2007 Kakumoto
2008/0284762 A1* 11/2008 Sakioka .................. H04N 5/376
345/204

(Continued)

FOREIGN PATENT DOCUMENTS

CN 101502100 A 8/2009
JP 10-200817 A 7/1998
(Continued)

OTHER PUBLICATIONS

International Search Report and Written Opinion of PCT Application No. PCT/JP2017/000008, dated Mar. 21, 2017, 06 pages of ISRWO.

*Primary Examiner* — Quan Pham
(74) *Attorney, Agent, or Firm* — Chip Law Group

(57) ABSTRACT

The disclosure relates to a solid-state imaging element, a driving method, and an electronic device that generates an arbitrary intermediate voltage level between a high voltage level and a low voltage level. The solid-state imaging element includes a first driving line that supplies selectively to a posterior stage, a first voltage level that is output from a first power source and a second voltage level that is output from a second power source and lower than the first voltage level. Also included is a second driving line that is different from the first driving line, a capacitance that is formed between the first driving line and the second driving line, and a floating setting unit that sets the first driving line to a floating state. The disclosure is applicable to, for example, a CMOS image sensor.

10 Claims, 18 Drawing Sheets

(51) Int. Cl.
*H04N 5/376* (2011.01)
*H04N 5/3745* (2011.01)

(56) References Cited

U.S. PATENT DOCUMENTS

| | | |
|---|---|---|
| 2010/0177230 A1 | 7/2010 | Himeno et al. |
| 2014/0061436 A1* | 3/2014 | Kobayashi ............. H04N 5/369 |
| | | 250/208.1 |
| 2015/0281610 A1* | 10/2015 | Ota ................... H01L 27/14643 |
| | | 250/208.1 |
| 2016/0353046 A1* | 12/2016 | Kuroda ............. H01L 27/14603 |

FOREIGN PATENT DOCUMENTS

| | | |
|---|---|---|
| JP | 2007-097127 A | 4/2007 |
| WO | 2008/018363 A1 | 2/2008 |

\* cited by examiner

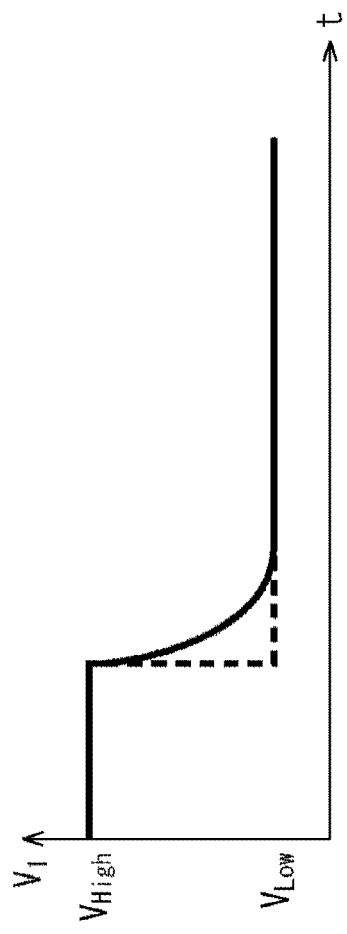
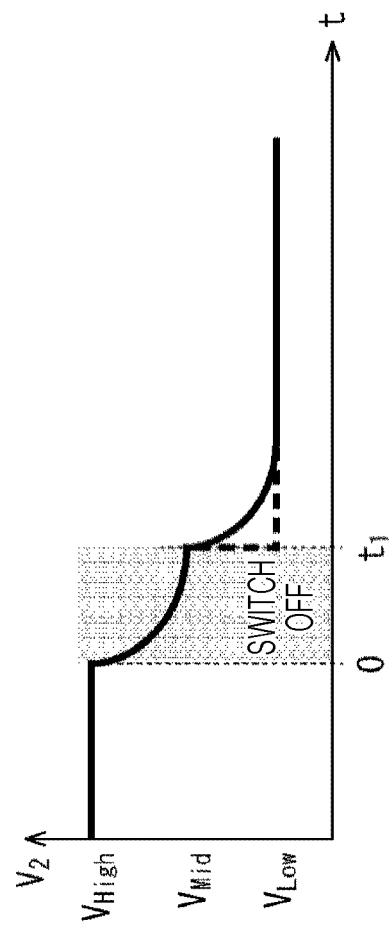
FIG. 4A
FIG. 4B

SOLID-STATE IMAGING ELEMENT, DRIVING METHOD, AND ELECTRONIC DEVICE

CROSS REFERENCE TO RELATED APPLICATIONS

This application is a U.S. National Phase of International Patent Application No. PCT/JP2017/000008 filed on Jan. 4, 2017, which claims priority benefit of Japanese Patent Application No. JP 2016-004904 filed in the Japan Patent Office on Jan. 14, 2016. Each of the above-referenced applications is hereby incorporated herein by reference in its entirety.

TECHNICAL FIELD

The present disclosure relates to a solid-state imaging element, a driving method, and an electronic device, particularly to a solid-state imaging element, a driving method, and an electronic device that can, on the basis of a power source with a high voltage level and a power source with a low voltage level used for transferring charges, for example, generate an arbitrary voltage level between the high voltage level and the low voltage level.

BACKGROUND ART

In a conventionally known method for improving the charge transfer efficiency and reducing hot carriers in a solid-state imaging element, in addition to a power source with a high voltage level and a power source with a low voltage level from a pixel driving line, a power source with one or more intermediate voltage levels between the high voltage level and the low voltage level is used (for example, see Patent Document 1).

CITATION LIST

Patent Document

Patent Document 1: Japanese Patent Application Laid-Open No. H10-200817

SUMMARY OF THE INVENTION

Problems to be Solved by the Invention

In the invention according to Patent Document 1, the power sources and power source lines for supplying the high voltage level, the low voltage level, and each intermediate voltage level, and switches for turning on or off those power source lines are necessary, and there has been a restriction in circuit design or an interruption in circuit scale reduction.

In addition, it has been impossible to generate an arbitrary intermediate voltage level between the high voltage level and the low voltage level.

The present disclosure has been made in view of such circumstances, and an object is to generate an arbitrary intermediate voltage level between the high voltage level and the low voltage level.

Solutions to Problems

A solid-state imaging element according to a first aspect of the present disclosure includes: a first driving line configured to supply selectively to a posterior stage, a first voltage level that is output from a first power source and a second voltage level that is output from a second power source and lower than the first voltage level; a second driving line that is different from the first driving line; a capacitance that is formed between the first driving line and the second driving line; and a floating setting unit configured to set the first driving line to a floating state.

The first driving line set to the floating state can be configured to supply to the posterior stage, a third voltage level between the first voltage level and the second voltage level in accordance with a change in voltage that is supplied to the second driving line by capacitive coupling.

The floating setting unit can include a first switch configured to connect between the first power source and the first driving line, and a second switch configured to connect between the second power source and the first driving line.

The capacitance formed between the first driving line and the second driving line can be a parasitic capacitance.

The capacitance formed between the first driving line and the second driving line can be an actual capacitance that is formed intentionally.

The first driving line and the second driving line can be pixel driving lines that are disposed adjacent to each other in a longitudinal direction.

The second driving line can be a line dedicated to the capacitive cup link coupling.

Each of the first driving line and the second driving line can include a plurality of driving lines.

The first driving line can be configured to supply any of the first voltage level, the second voltage level, and the third voltage level to a transfer gate electrode in the posterior stage.

A driving method according to a first aspect of the present disclosure is a driving method for a solid-state imaging element including a first driving line configured to supply selectively to a posterior stage, a first voltage level that is output from a first power source and a second voltage level that is output from a second power source and lower than the first voltage level, a second driving line that is different from the first driving line, a capacitance that is formed between the first driving line and the second driving line, and a floating setting unit configured to set the first driving line to a floating state, the method including the steps of: setting the first driving line configured to supply the first voltage level to the posterior stage, to the floating state; and lowering the voltage level to be supplied to the second driving line and supplying a third voltage level between the first voltage level and the second voltage level to the posterior stage from the first driving line by capacitive coupling.

An electronic device including a solid-state imaging element according to a second aspect of the present disclosure includes: a first driving line configured to supply selectively to a posterior stage, a first voltage level that is output from a first power source and a second voltage level that is output from a second power source and lower than the first voltage level; a second driving line that is different from the first driving line; a capacitance that is formed between the first driving line and the second driving line; and a floating setting unit configured to set the first driving line to a floating state.

According to the first aspect and the second aspect of the present disclosure, the first driving line configured to supply the first voltage level to the posterior stage is set to the floating state, the level of voltage to be supplied to the second driving line is lowered, and the third voltage level between the first voltage level and the second voltage level is supplied from the first driving line to the posterior stage.

Effects of the Invention

According to the first aspect of the present disclosure, the arbitrary intermediate voltage level can be generated on the basis of the high voltage level and the low voltage level, and the charge readout can be performed efficiently.

According to the second aspect of the present disclosure, the charges can be readout efficiently in the solid-state imaging element.

BRIEF DESCRIPTION OF DRAWINGS

FIGS. 4A and 4B a are timing charts in accordance with FIG. 3.

MODE FOR CARRYING OUT THE INVENTION

A best mode for carrying out the present disclosure (hereinafter referred to as embodiment) will hereinafter be described in detail with reference to the drawings. First, a basic principle of the present disclosure is described.

<Basic Principle>

Figure 1:
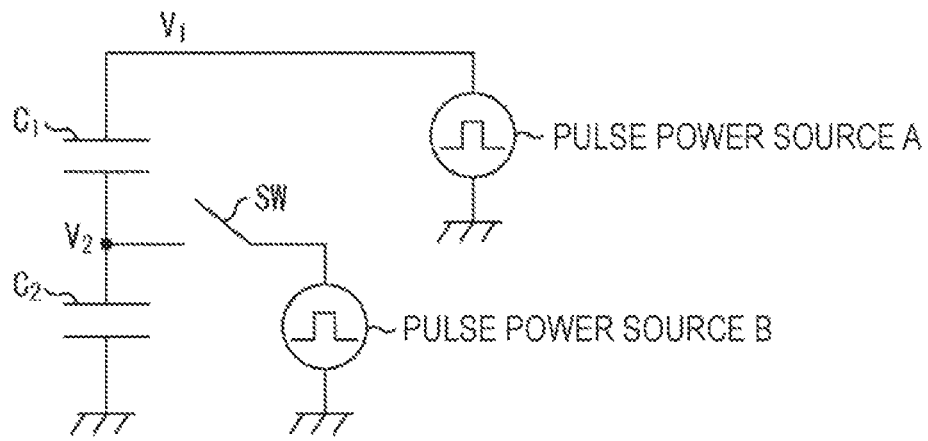
FIG. 1 is a circuit diagram for describing a basic principle of the present disclosure.

FIG. 1 is a circuit diagram for describing a basic principle of the present disclosure.

The circuit illustrated in FIG. 1 includes a capacitance $C_1$ and a capacitance $C_2$ that are connected in series. The capacitance $C_1$ has one end connected to a pulse power source A through a line $V_1$ and the other end connected to the capacitance $C_2$ through a line $V_2$. On the other hand, one end of the capacitance $C_2$ that is not connected to the capacitance $C_1$ is grounded. To the line $V_2$, a pulse power source B is connected through a switch SW.

Note that the capacitance $C_1$ and the capacitance $C_2$ are not formed actually, and the capacitance $C_1$ corresponds to a parasitic capacitance generated between the line $V_1$ and the line $V_2$. The capacitance $C_2$ corresponds to the synthetic capacitance of all the capacitances connected to the line $V_2$.

The pulse power sources A and B are ideal power sources that can change voltages in a pulsed manner.

Figure 2:
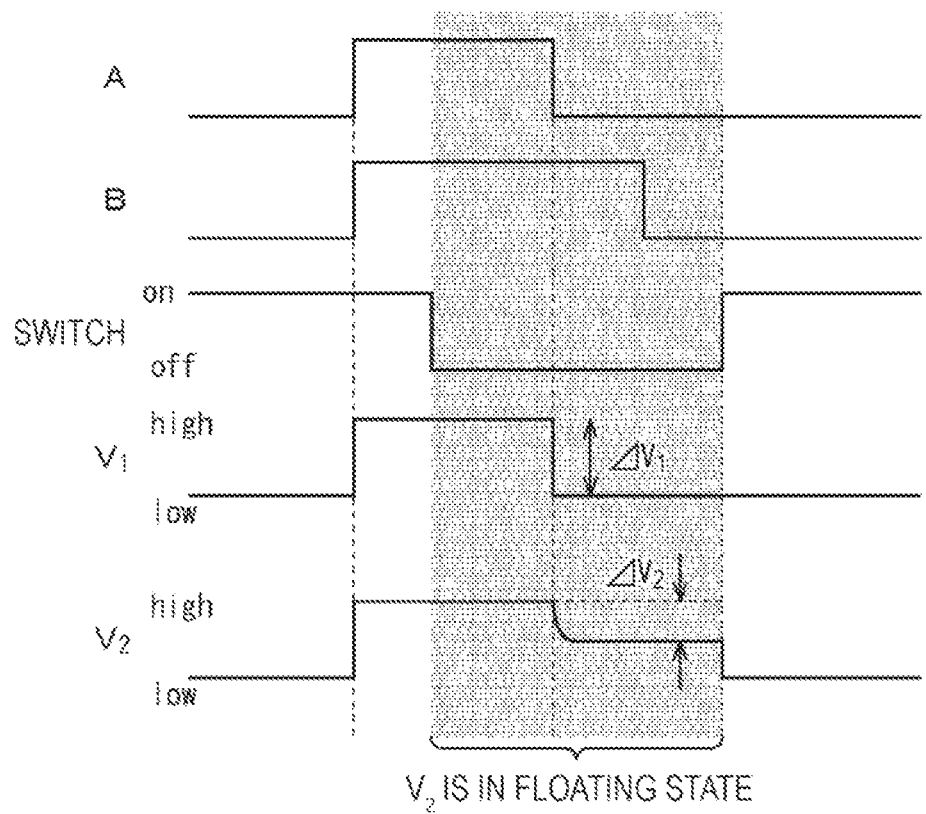
FIG. 2 is a timing chart in accordance with FIG. 1.

FIG. 2 shows voltage changes of the pulse power sources A and B, timings when the switch SW is turned on or off, and changes of a voltage generated in the line $V_1$ (referred to as voltage $V_1$) and a voltage generated in the line $V_2$ (referred to as voltage $V_2$) that occur accordingly.

As shown in FIG. 2, the voltage $V_1$ generated in the line $V_1$ varies in synchronization with the pulse power source A without depending on whether the switch SW is on or off.

On the other hand, the voltage $V_2$ generated in the line $V_2$ varies in synchronization with the pulse power source B when the switch SW is on. However, when the switch SW is off, the line $V_2$ is in a floating state (also referred to as a high impedance (high-Z) state) so that the capacitance $C_1$ and the capacitance $C_2$ are coupled. Here, due to an influence of the voltage $V_1$ that drives the capacitance $C_1$, the voltage $V_2$ decreases by a voltage $\Delta V_2$ following the decrease of the voltage $V_1$. Here, the voltage $\Delta V_2$ and the voltage $V_1$ are in a relation as expressed by the following expression (1), where $\Delta V_1$ represents a variation width of the voltage $V_1$:

[Expression 1]

$$\Delta V_2 = \frac{C_1}{C_1 + C_2} \Delta V_1 \qquad (1)$$

In other words, if the line $V_2$ is set to the floating state, the voltage $V_2$ generated in the line $V_2$ can be controlled by using the pulse power source A.

However, the changes of the voltage $V_1$ generated in the line $V_1$ and the voltage $V_2$ generated in the line $V_2$ do not end instantly as shown in FIG. 2 but take a certain length of time (transition time).

Figure 3:
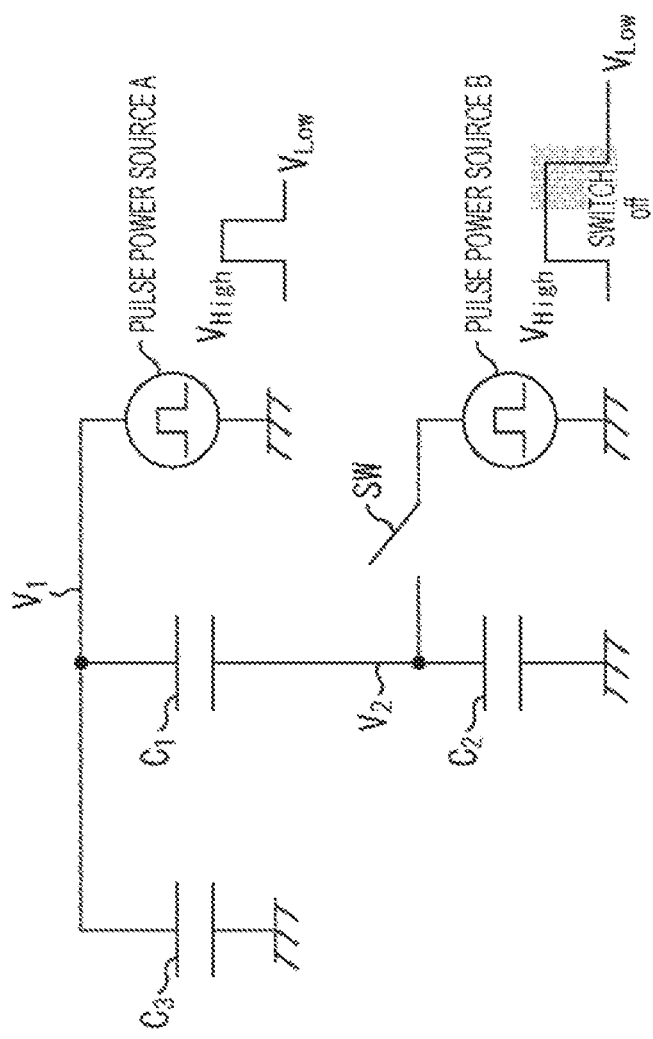
FIG. 3 is a diagram for describing a transition time in a circuit illustrated in FIG. 1.

Next, FIG. 3 is a circuit diagram for describing the time (transition time) necessary to change the voltage $V_1$ generated in the line $V_1$ and the voltage $V_2$ generated in the line $V_2$.

FIG. 3 additionally includes a capacitance $C_3$ to the line $V_1$ in the circuit diagram illustrated in FIG. 1. The capacitance $C_3$ has one end grounded. Moreover, FIG. 3 shows a relation between the voltage change of the pulse power source B, and the timing when the switch SW is turned on or off, that is, the timing when the line $V_2$ is set to the floating state. That is to say, the pulse power source B changes from a high voltage level $V_{high}$ to a low voltage level $V_{Low}$ while the line $V_2$ is in the flowchart state.

FIGS. 4A and 4B show changes of the voltage V1 generated in the line V1 and the voltage V2 generated in the line V2 in accordance with FIG. 3.

As shown in FIG. 4A, the voltage V1 generated in the line V1 starts to decrease from the Vhigh state at the same time as the pulse power source A decreases, and decreases to VLow in accordance with the following expression (2):

[Expression 2]

$$V_1 = (V_{High} - V_{Low}) \times e^{\frac{-t}{(C_{12}+C_3)R}} + V_{Low} \quad (2)$$

In the expression (2), a capacitance $C_{12}$ is a synthetic capacitance of the capacitance $C_1$ and the capacitance $C_2$, and is expressed by the following expression (3):

[Expression 3]

$$C_{12} = \frac{C_1 C_2}{C_1 + C_2} = \frac{C_1}{\frac{C_1}{C_2}+1} \quad (3)$$

On the other hand, when the switch SW is turned off at a timing 0 to make the line V2 in a floating state as shown in FIG. 4B, the voltage V2 generated in the line V2 starts to decrease from Vhigh following the decrease of the voltage V1 in accordance with the expression (4) below:

[Expression 4]

$$V_2 = \frac{C_1}{C_1+C_2} \times \left\{(V_{High} - V_{Low}) \times e^{\frac{-t}{(C_{12}+C_3)R}} + V_{Low}\right\} \quad (4)$$

When the switch SW is turned on at a timing $t_1$ to release the line $V_2$ from the floating state, the voltage $V_2=V_{mid}$ at that time is obtained in accordance with the following expression (5):

[Expression 5]

$$V_2 = 0.99 \times \frac{C_1}{C_1+C_2}(V_{High} - V_{Low}) \quad (5)$$

When the line $V_2$ is released from the floating state, the pulse power source B has already decreased to $V_{Low}$; therefore, the voltage $V_2$ generated in the line $V_2$ decreases from $V_{Mid}$ to $V_{Low}$ in accordance with the following expression (6):

[Expression 6]

$$V_2 = (V_{Mid} - V_{Low}) \times e^{\frac{-(t-t_1)}{(C_1+C_2)R}} + V_{Low} \quad (6)$$

As described above, in a case of the floating state, the voltage $V_2$ generated in the line V2 changes following the change of the voltage $V_1$. Therefore, the change of the voltage $V_2$ does not occur before the change of the voltage $V_1$, and the transition of the voltage $V_2$ can be performed at the same time as that of the voltage $V_1$. Moreover, if the line V2 is released from the floating state before the voltage $V_2$ becomes $V_{Low}$, the voltage $V_2$ can be set to an arbitrary intermediate voltage level $V_{Mid}$ between the high voltage level $V_{High}$ and the low voltage level $V_{Low}$.

Figure 5:
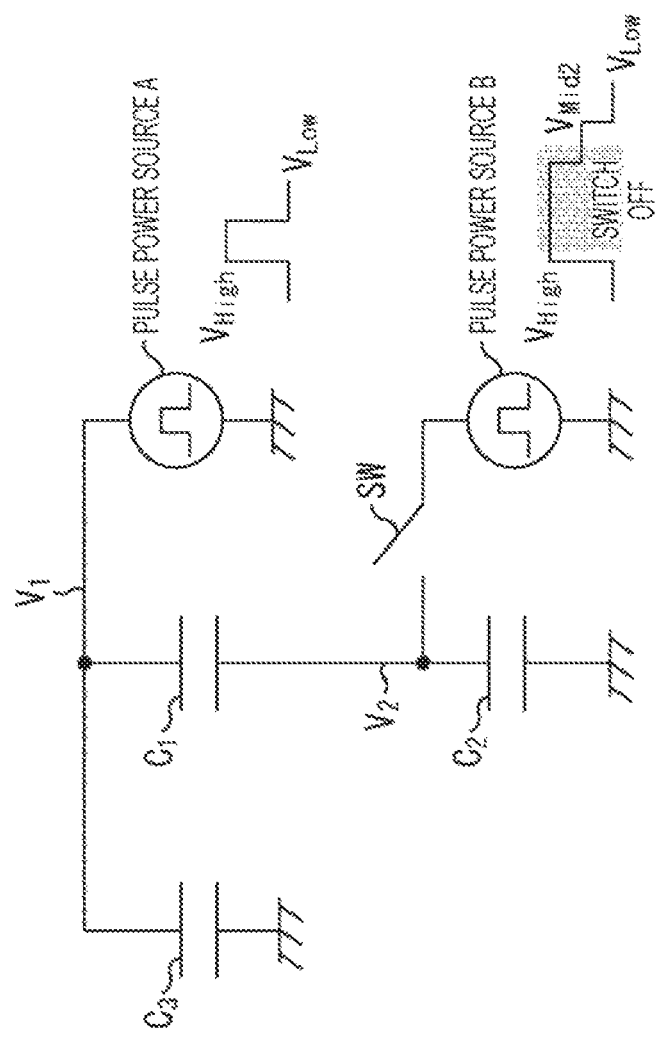
FIG. 5 is a diagram for describing a method for causing an intermediate voltage level to transit smoothly.

Next, FIG. 5 shows a change in voltage of the pulse power source B and a timing when the switch SW is turned on or off (that is, timing of floating state) in a case where the transition of the voltage V2 generated in the line V2 is performed more smoothly than the transition shown in FIG. 4B.

That is to say, while the line $V_2$ is in the floating state, the voltage of the pulse power source B is changed into an intermediate voltage level $V_{Mid2}$ between the high voltage level $V_{High}$ and the low voltage level $V_{Low}$. Next, after the release from the floating state, the voltage of the pulse power source B may be changed from the intermediate voltage level $V_{Mid2}$ to the low voltage level $V_{Low}$.

Figure 6A:
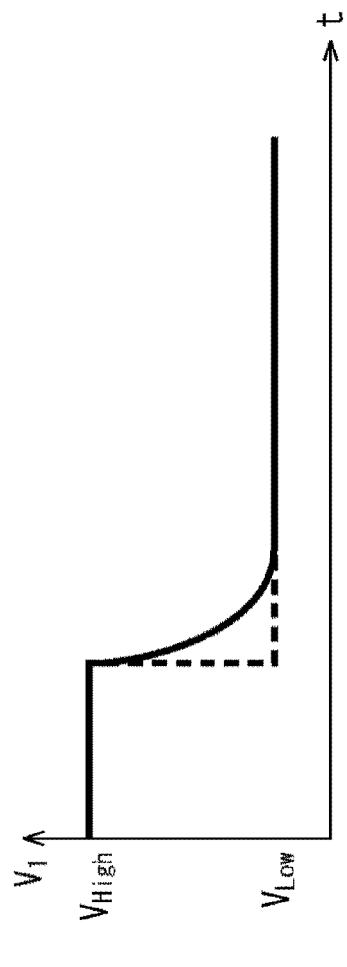
FIGS. 6A and 6B are timing charts in accordance with FIG. 5.
Figure 6B:
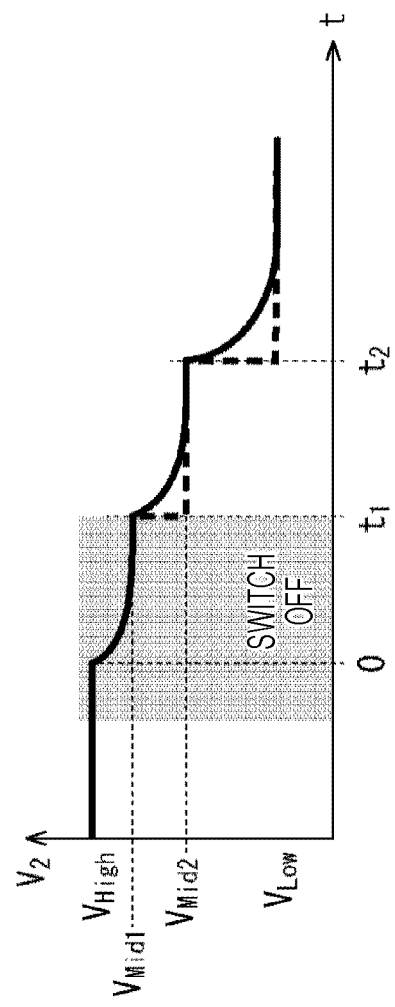

FIGS. 6A and 6B show a change of the voltage V1 generated in the line V1 and a change of the voltage V2 generated in the line V2 in accordance with FIG. 5.

The voltage V1 generated in the line V1 starts to decrease at the same time as the pulse power source A decreases as shown in FIG. 6A and this is similar to FIG. 4A. The voltage V1 decreases from Vhigh to VLow in accordance with the expression (2).

On the other hand, as shown in FIG. 6B, when the switch SW is turned off at a timing 0 to make the line V2 in a floating state, the voltage V2 generated in the line V2 decreases from Vhigh following the decrease of the voltage V1 in accordance with the expression (4).

After that, assuming that the voltage when the switch SW is turned on at the timing $t_1$ to release the line $V_2$ from the floating state is $V_{Mid1}$, the voltage of the pulse power source B when the line $V_2$ is released from the floating state has already decreased to $V_{Mid2}$; therefore, the voltage $V_2$ decreases from $V_{Mid1}$ to $V_{Mid2}$ in accordance with the following expression (7):

[Expression 7]

$$V_2 = (V_{Mid1} - V_{Mid2}) \times e^{\frac{-(t-t_1)}{(C_1+C_2)R}} + V_{Mid2} \quad (7)$$

In addition, when the voltage of the pulse power source B decreases from $V_{Mid2}$ to $V_{Low}$ at a timing $t_2$, the voltage $V_2$ decreases from $V_{Mid2}$ to $V_{Low}$ in accordance with the following expression (8):

[Expression 8]

$$V_2 = (V_{Mid2} - V_{Low}) \times e^{\frac{-(t-t_1)}{(C_1+C_2)R}} + V_{Low} \quad (8)$$

As described above, if the voltage of the pulse power source B can be set to the intermediate voltage level VMid2 between the high voltage level VHigh and the low voltage level VLow, the transition of the voltage V2 generated in the line V2 can be performed more smoothly than the transition in the case of FIG. 4B. In this case, since the voltage V2 can be set to two kinds of intermediate voltage levels VMid1 and VMid2, using this for charge transfer in a solid-state imaging element can improve the transfer efficiency further.

First Embodiment

Figure 7:
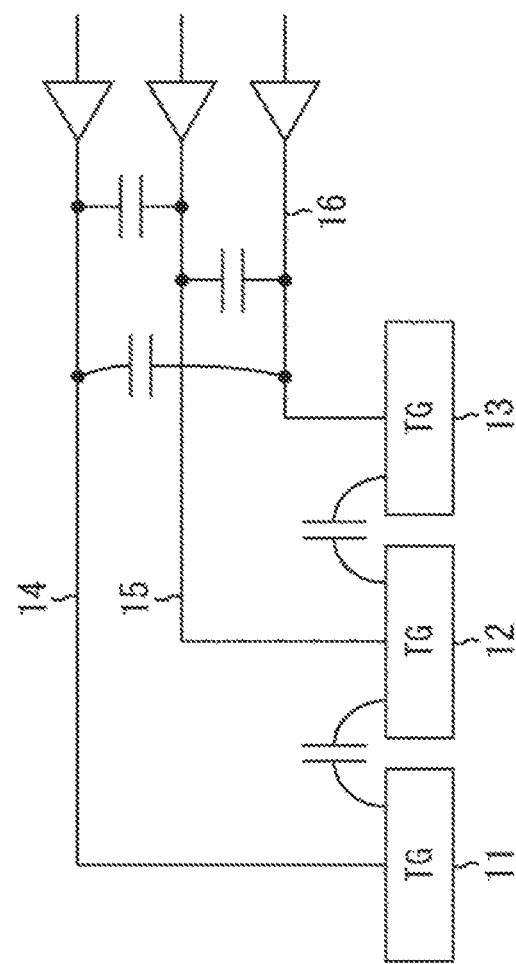
FIG. 7 is a circuit diagram illustrating a first embodiment of the present disclosure.

Next, FIG. 7 is a circuit diagram of a first embodiment according to the present disclosure, in which the aforementioned basic principle is applied to a solid-state imaging element.

FIG. 7 illustrates three transfer gate electrodes TG11 to TG13 and driving lines 14 to 16 connected respectively to the three transfer gate electrodes TG11 to TG13 in the solid-state imaging element. That is to say, a driving pulse TG11 is applied to the transfer gate electrode TG11 through the driving line 14. Similarly, a driving pulse TG12 is applied to the transfer gate electrode TG12 through the driving line 15, and a driving pulse TG13 is applied to the transfer gate electrode TG13 through the driving line 16.

The driving lines 14 to 16 can be set to a floating state at an arbitrary timing. The driving lines 14 to 16 are disposed adjacent to each other. Therefore, a parasitic capacitance is generated between the driving lines 14 to 16. Similarly, a parasitic capacitance is generated between the transfer gate electrodes TG11 to TG13 that are disposed adjacent to each other. By using the parasitic capacitance as the capacitances $C_1$ and $C_2$ in the basic principle described above, the operation similar to that of the basic principle can be obtained.

Note that a capacitance that is designed intentionally in the circuit may be formed in addition to the parasitic capacitance generated between the driving lines 14 to 16 or between the transfer gate electrodes TG11 to TG13.

Figure 8:
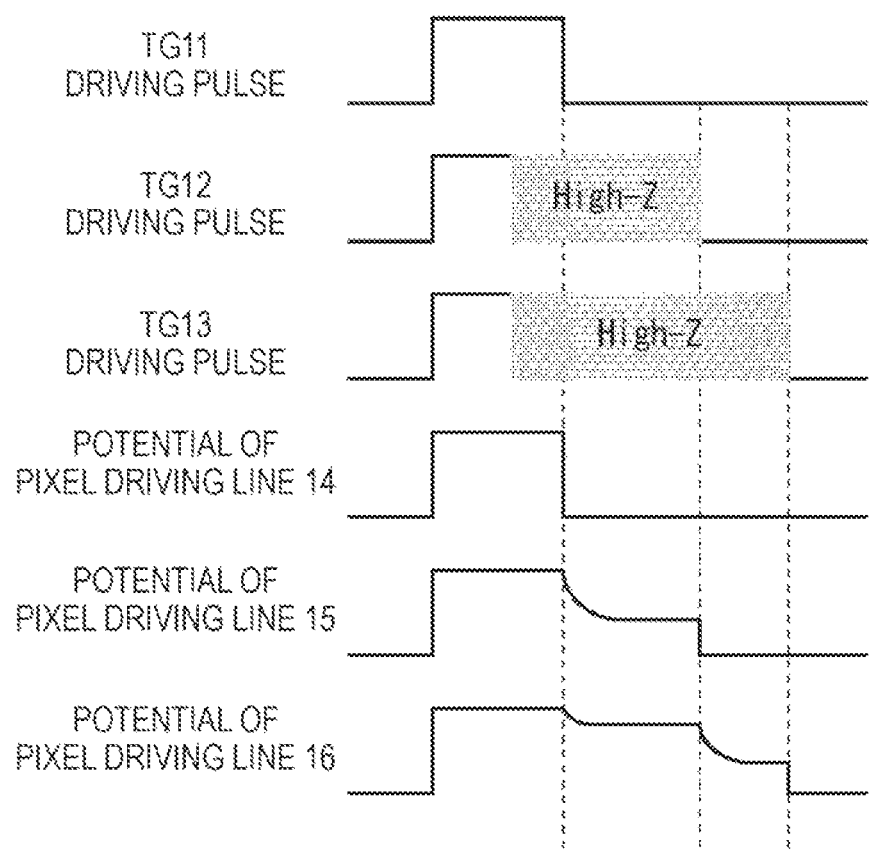
FIG. 8 is a timing chart in accordance with FIG. 7.

FIG. 8 shows the driving pulses TG11 to TG13 that are supplied to the driving lines 14 to 16 in FIG. 7, and voltage changes of the driving lines 14 to 16.

As shown in FIG. 8, when the driving pulse TG11 is applied to the transfer gate electrode TG11 through the driving line 14, setting the driving lines 15 and 16 to the floating state makes it possible to apply the intermediate voltage to the transfer gate electrodes TG12 and TG13. Next, when the driving pulse TG12 is applied to the transfer gate electrode TG12 through the driving line 15, maintaining the driving line 16 in the floating state makes it possible to apply an intermediate voltage that is different in level from the previous voltage to the transfer gate electrode TG13.

Next, FIG. 9 to FIG. 12 more specifically express the first embodiment shown in FIG. 7. That is to say, FIG. 9 expresses a circuit configuration to set two of the three driving lines 14 to 16 in FIG. 7 to the floating state.

Figure 9:
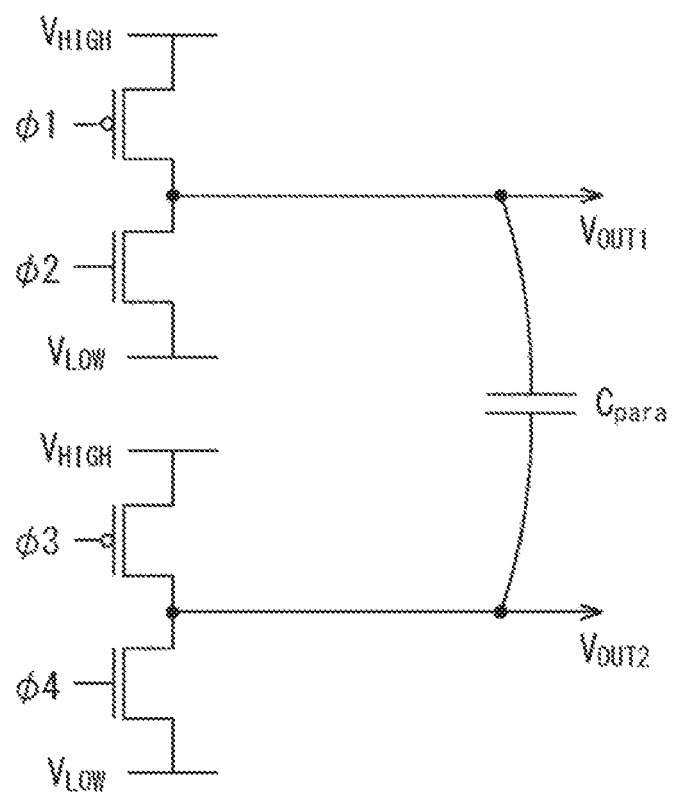
FIG. 9 is a circuit diagram illustrating a configuration to set driving lines in FIG. 7 to a floating state.
Figure 10:
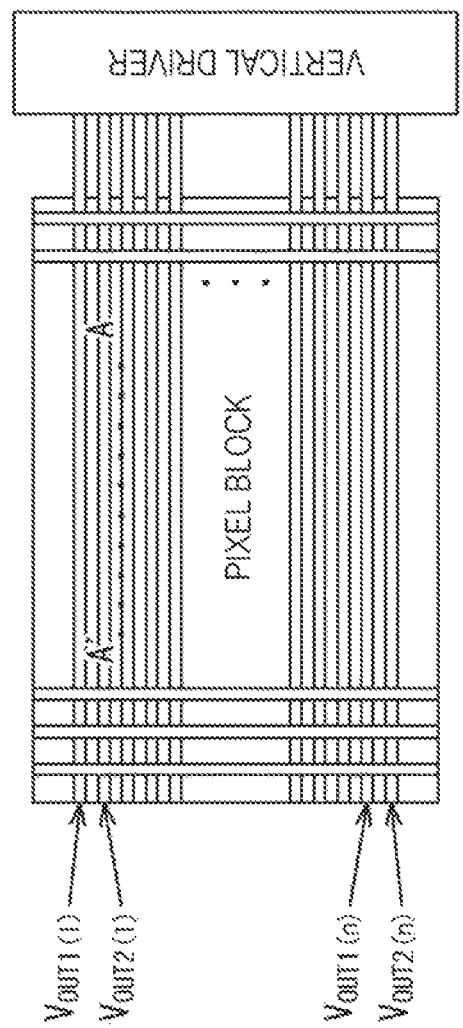
FIG. 10 is a diagram illustrating a specific arrangement of two driving lines illustrated in FIG. 9 in a solid-state imaging element.
Figure 11:
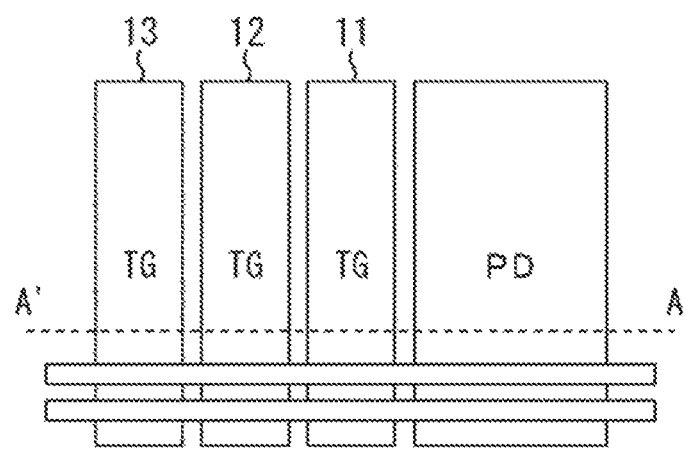
FIG. 11 is a plan view illustrating an arrangement of driving lines and transfer gate electrodes.
Figure 12:
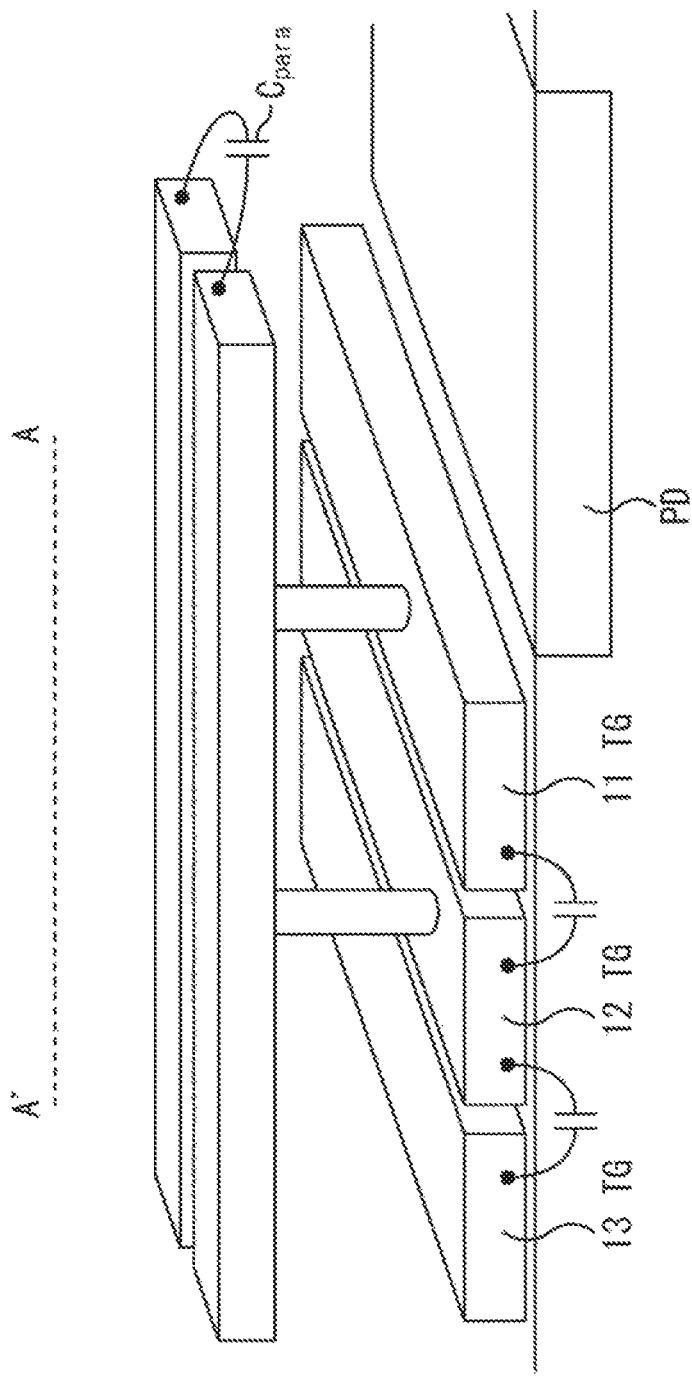
FIG. 12 is a stereoscopic perspective view in accordance with FIG. 7.

FIG. 10 illustrates a specific arrangement of the two driving lines shown in FIG. 9 in the solid-state imaging element, and a vertical driver in the drawing includes the circuit configuration shown in FIG. 9. FIG. 11 illustrates an arrangement of the transfer gate electrodes that are disposed in a layer below the driving lines along line AA' in FIG. 10. FIG. 12 stereoscopically illustrates an arrangement of the driving lines and the transfer gate electrodes.

A driving line $V_{OUT1}$ shown in FIG. 9 corresponds to the driving line 14 in FIG. 7. To the driving line $V_{OUT1}$, a driving pulse at the high voltage level $V_{High}$ is supplied through a PMOS switch ϕ1 and a driving pulse at the low voltage level $V_{Low}$ is supplied through an NMOS switch ϕ2. The PMOS switch ϕ1 is turned on when an input ϕ1 to a gate of the PMOS switch ϕ1 is Low, so that the voltage at the high voltage level $V_{High}$ is output to the driving line $V_{OUT1}$. The PMOS switch ϕ1 is turned off when the input ϕ1 to the gate is High. The NMOS switch ϕ2 is turned on when an input ϕ2 to a gate of the NMOS switch ϕ2 is Low, so that the voltage at the low voltage level $V_{Low}$ is output to the driving line $V_{OUT1}$. The NMOS switch ϕ2 is turned off when the input ϕ2 to the gate is Low.

A driving line $V_{OUT2}$ corresponds to the driving line 15 in FIG. 7. To the driving line $V_{OUT2}$, a driving pulse at the high voltage level $V_{High}$ is supplied through a PMOS switch ϕ3 and a driving pulse at the low voltage level $V_{Low}$ is supplied through an NMOS switch ϕ4. The PMOS switch ϕ3 is turned on when an input ϕ3 to a gate of the PMOS switch ϕ3 is Low, so that the voltage at the high voltage level $V_{High}$ is output to the driving line $V_{OUT2}$. The PMOS switch ϕ3 is turned off when the input ϕ3 to the gate is High. The NMOS switch ϕ4 is turned on when an input ϕ4 to a gate of the NMOS switch ϕ4 is High, so that the voltage at the low voltage level $V_{Low}$ is output to the driving line $V_{OUT2}$. The NMOS switch ϕ4 is turned off when the input ϕ4 to the gate is Low.

A capacitance $C_{para}$ corresponds to a parasitic capacitance generated between the driving line $V_{OUT1}$ and the driving line $V_{OUT2}$.

Figure 13:
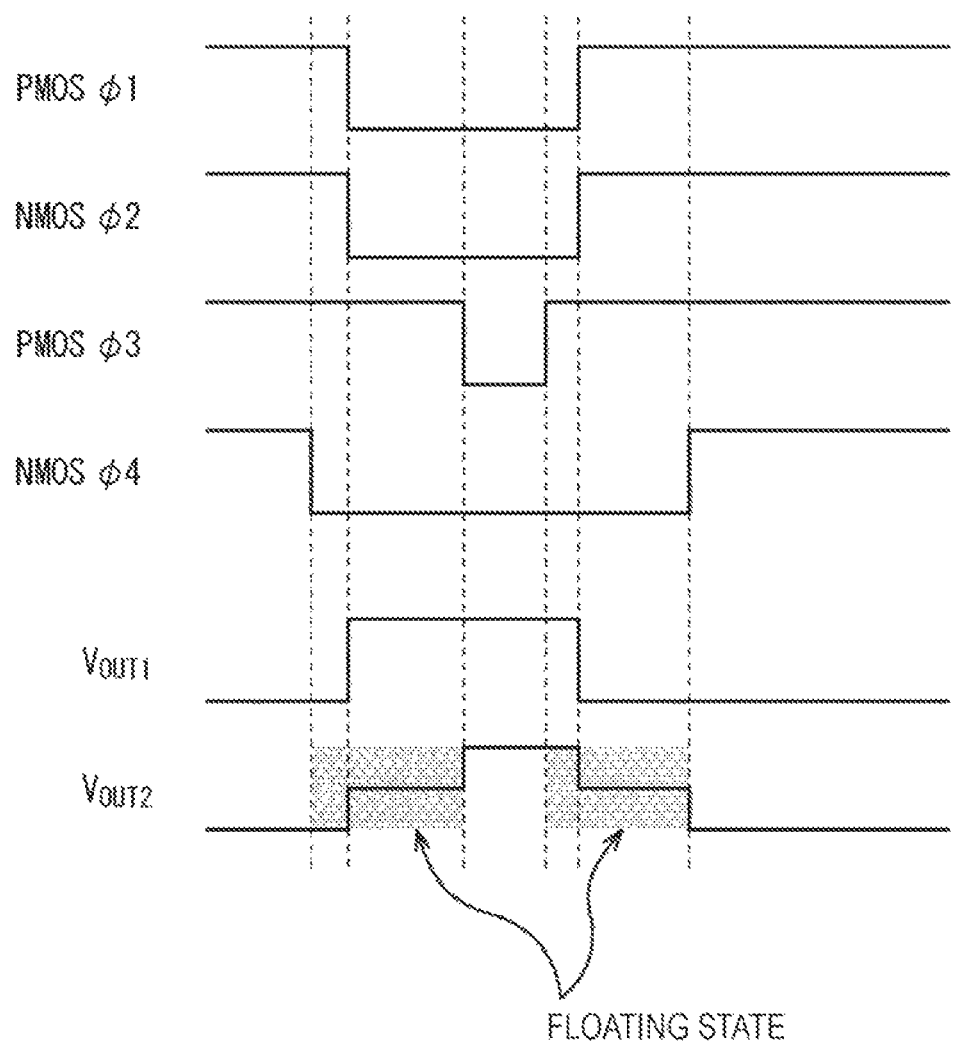
FIG. 13 is a timing chart in accordance with FIG. 9.

FIG. 13 is a timing chart expressing a voltage change in the driving lines $V_{OUT1}$ and $V_{OUT2}$ in FIG. 9.

The driving line $V_{OUT2}$ can be set to the floating state when the input ϕ3 to the gate of the PMOS switch ϕ3 is set to High and the input ϕ4 to the gate of the NMOS switch ϕ4 is set to Low. Here, the voltage $V_{OUT2}$ of the driving line $V_{OUT2}$ follows the voltage $V_{OUT1}$ of the driving line $V_{OUT1}$ by the capacitive coupling driving through the parasitic capacitance $C_{para}$; therefore, the intermediate voltage level can be generated in the voltage $V_{OUT2}$ of the driving line $V_{OUT2}$.

Second Embodiment

Figure 14:
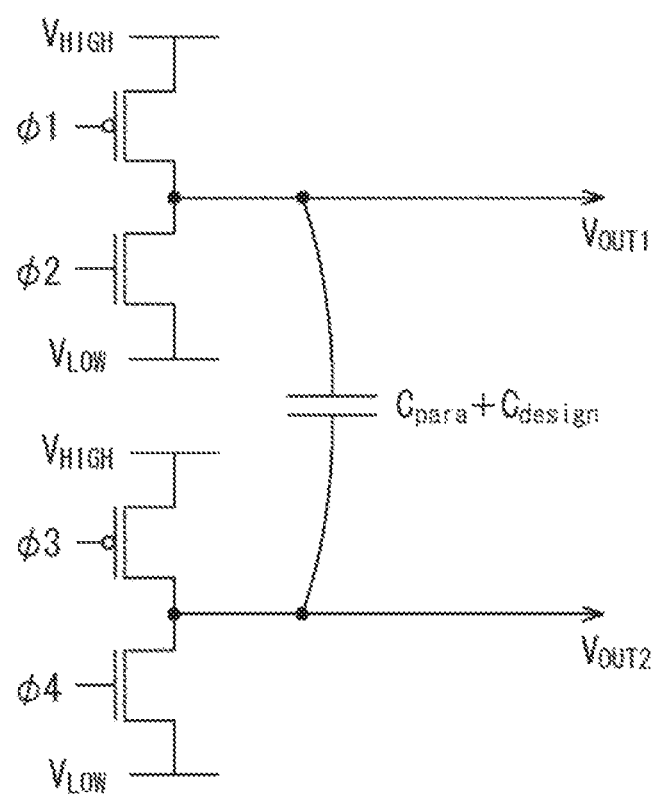
FIG. 14 is a circuit diagram illustrating a second embodiment of the present disclosure.

Next, FIG. 14 is a circuit diagram of a second embodiment according to the present disclosure. In the second embodiment, a capacitance $C_{design}$ that is designed intentionally is added to the configuration shown in FIG. 9 between the driving line $V_{OUT1}$ and the driving line $V_{OUT2}$.

Figure 15:
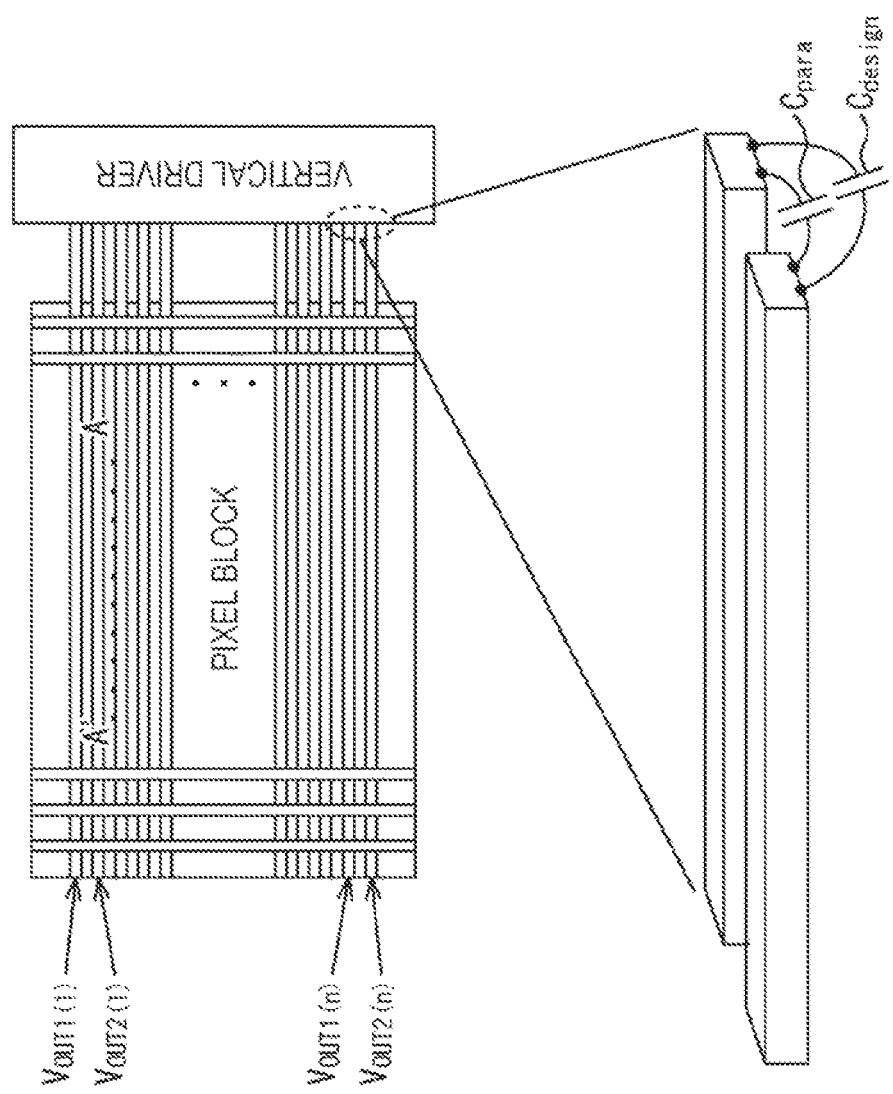
FIG. 15 is a stereoscopic perspective view in accordance with FIG. 14.

FIG. 15 stereoscopically illustrates an arrangement of the driving lines and the transfer gate electrodes in a case where the capacitance $C_{design}$ is added between the driving lines.

In regard to the type of capacitance $C_{design}$, an arbitrary capacitance such as a MEM capacitance or a MOS capacitance can be used. The size of the capacitance $C_{design}$ is determined by calculating a change in potential by a capacitance division ratio.

Third Embodiment

Figure 16:
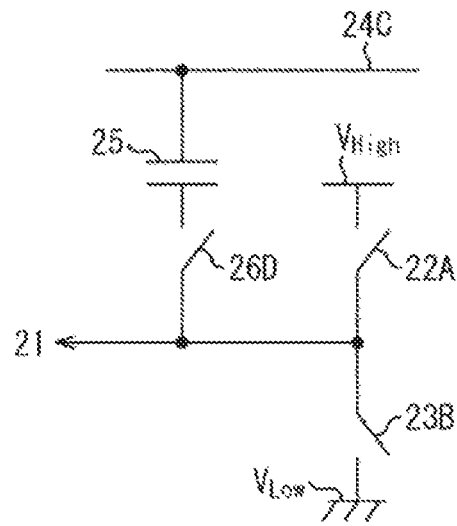
FIG. 16 is a circuit diagram illustrating a third embodiment of the present disclosure.

Next, FIG. 16 is a circuit diagram of a vertical driver of a third embodiment according to the present disclosure.

The vertical driver of the third embodiment includes a pixel driving line 21 that can output an intermediate voltage level in addition to the high voltage level $V_{High}$ and the low voltage level $V_{Low}$. To the pixel driving line 21, a switch 22A that turns on or off the supply of voltage at the high voltage level $V_{High}$ and a switch 23B that turns on or off the supply of voltage at the low voltage level $V_{Low}$ are connected. In addition, to the pixel driving line 21, a coupling driving line 24C is connected through a coupling capacitance 25 and a switch 26D that are connected in series. By turning off the switches 22A and 23B, the pixel driving line 21 can be set to the floating state.

Figure 17:
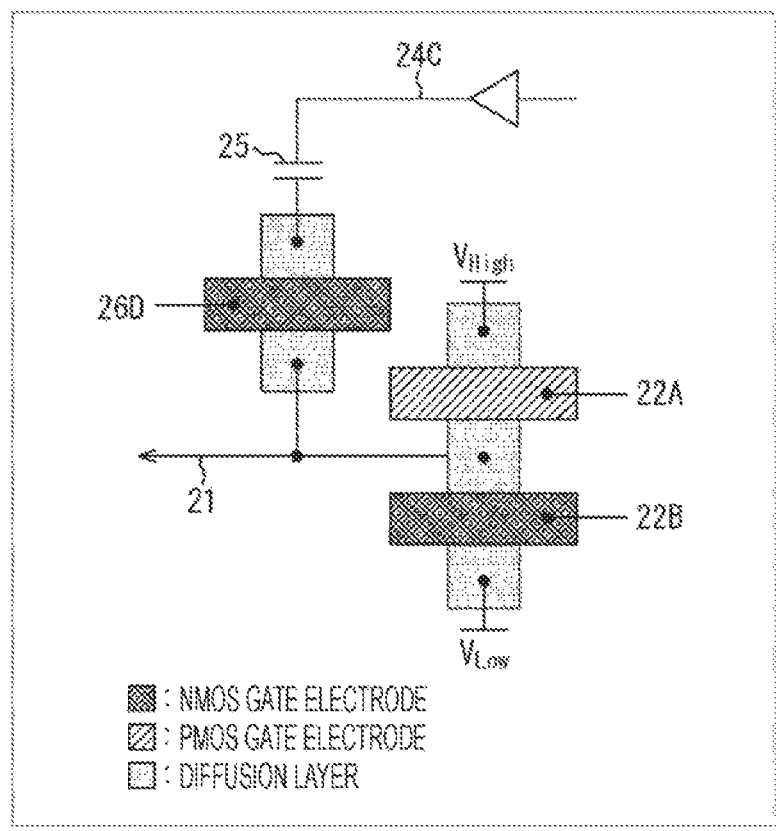
FIG. 17 is a circuit diagram illustrating a specific example of FIG. 16.

FIG. 17 illustrates a circuit configuration in a case where the switch 22A, the switch 23B, and the switch 26D in FIG. 16 are achieved by a PMOS gate electrode, an NMOS gate electrode, and an NMOS gate electrode formed on a diffusion layer, respectively.

Figure 18:
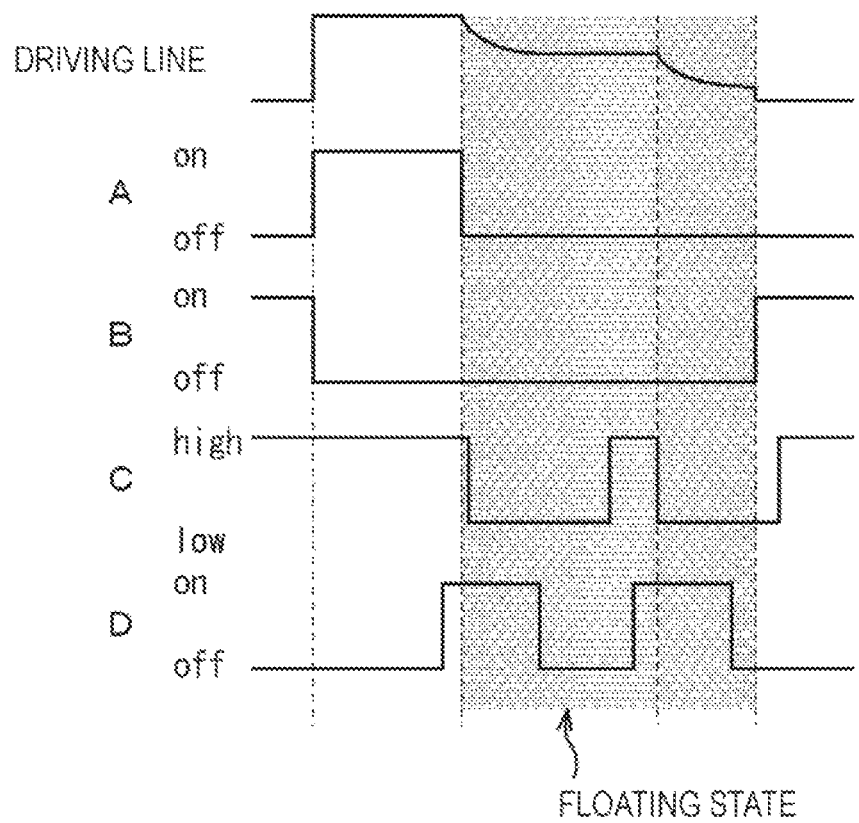
FIG. 18 is a timing chart in accordance with FIG. 16.

FIG. 18 is a timing chart in a case where the pixel driving line 21 in FIG. 16 outputs the intermediate voltage level.

By turning off the switches 22A and 23B after turning on the switch 26D, the pixel driving line 21 can be set to the floating state. Here, if the voltage of the coupling driving line 24C is changed from $V_{High}$ to $V_{Low}$, the intermediate voltage level can be generated in the pixel driving line 21 by using the capacitive coupling.

After that, if the voltage of the coupling driving line 24C is returned to $V_{High}$ after the switch 26D is turned off and then the voltage of the coupling driving line 24C is changed from $V_{High}$ to $V_{Low}$ by turning on the switch 26D again, an intermediate voltage level that is different from the previous one can be generated in the pixel driving line 21.

As described above, the intermediate voltage level can be generated in the pixel driving line 21 by turning on or off the switch 26D that connects between the pixel driving line 21 and the coupling capacitance 25 and changing the voltage of the coupling driving line 24C at least once or more.

Note that it is also possible to change the capacitance value for coupling and adjust the potential variation amount by connecting a plurality of combinations of switches and capacitances to connect between the pixel driving line 21 and the coupling driving line 24C in parallel and adjusting the number of switches to be turned on or off.

The coupling driving line 24C may be shared among a plurality of pixel driving lines 21.

<Example of Using Intermediate Voltage Level>

Figure 19:
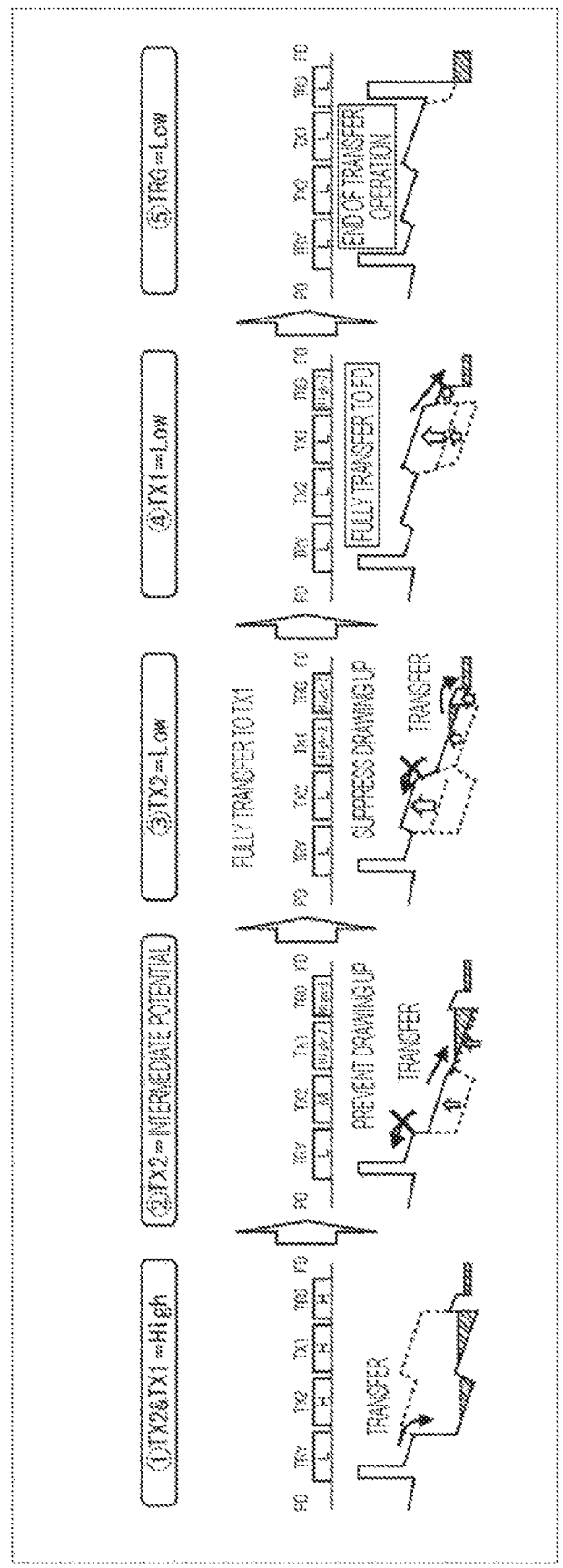
FIG. 19 is a diagram for describing a case in which an intermediate voltage level is used for charge transfer in a solid-state imaging element.

FIG. 19 shows an effect in a case where the intermediate voltage level obtained by the first to third embodiments is used for charge transfer in the solid-state imaging element.

In a case where the intermediate voltage level is used for charge transfer, the transition of the pixel driving line that is driven previously in time by the capacitive coupling generates the intermediate potential in the pixel driving line that is driven next in time; therefore, the transition in the posterior stage does not occur before the transition and the potential state in the anterior stage. As a result, even if the transition to the intermediate potential in the next line has started at the same time as the line that is driven previously, the charges can be transferred to the posterior stage for sure and the pulse intervals can be reduced. Accordingly, it is expected that the charge transfer efficiency and the transfer speed can be improved and moreover, the operation speed of the entire solid-state imaging element can be improved.

<Example of Using Image Sensor>

Figure 20:
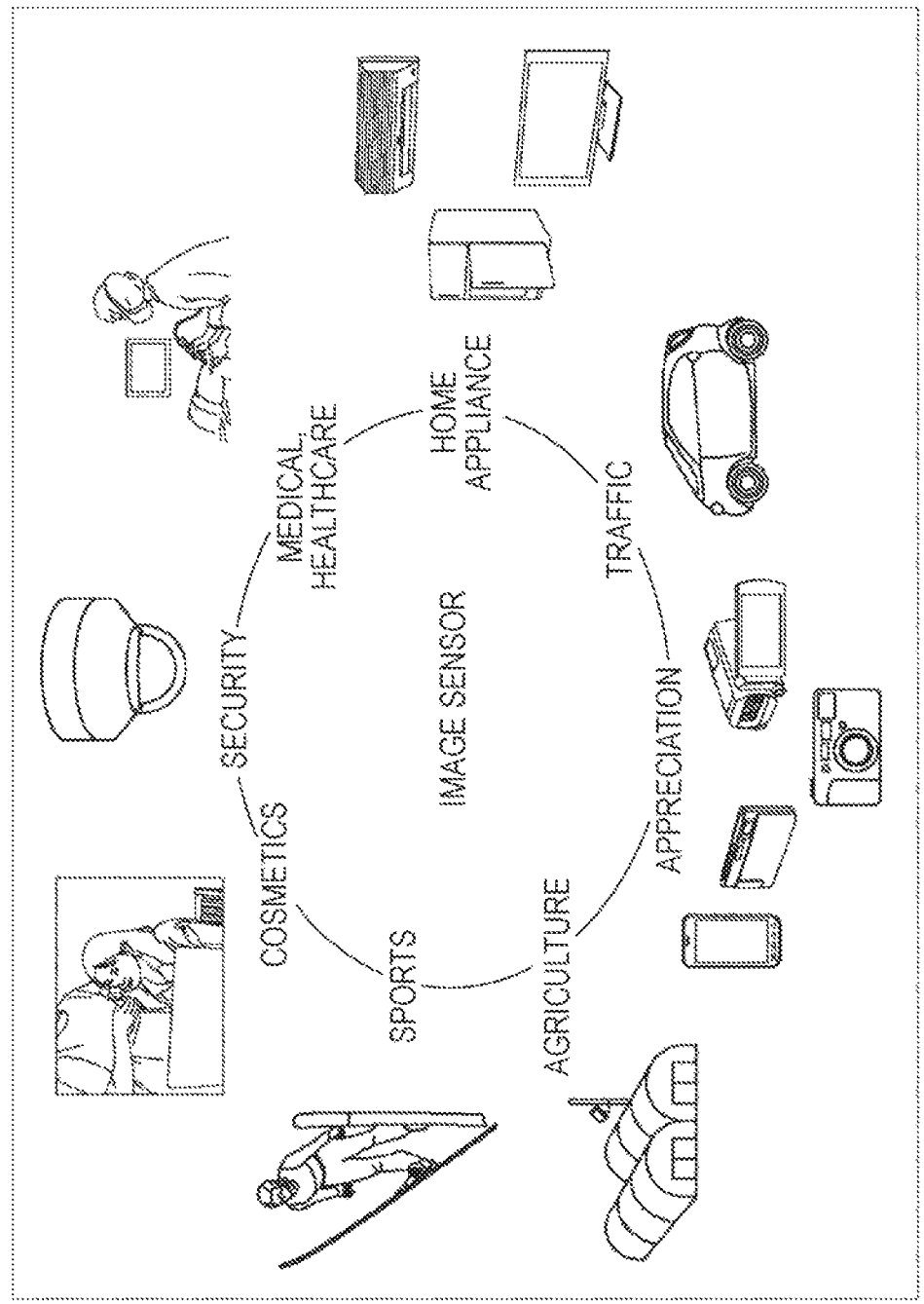
FIG. 20 is a diagram illustrating examples of using an electronic device to which the present disclosure has been applied.

FIG. 20 shows examples of using an image sensor to which the present disclosure has been applied.

The image sensor described above is applicable to various cases for sensing light such as visible light, infrared light, ultraviolet light, and X-ray, which will be described below.

Devices for photographing an image for appreciation, such as a digital camera and a portable device with a camera function;

Devices to be used for traffic to enable safe driving, for example automatic stop, recognition of a state of a driver, and so on; for example, an on-vehicle sensor that photographs an image in front of, behind, around, or inside the vehicle, a monitor camera that monitors a traveling vehicle and a road, and a range sensor that measures the distance between vehicles;

Devices to be used for home appliances such as a TV, a refrigerator, and an air conditioner to photograph a user's gesture and perform an operation indicated by the gesture;

Devices to be used for medical or healthcare purposes, such as an endoscope and an angiography device using an infrared ray;

Devices to be used for security, such as a surveillance camera to prevent crimes, and a camera for person authentication;

Devices to be used for cosmetics, such as a skin checker to photograph skin, and a microscope to photograph scalp;

Devices to be used for sports, such as an action camera and a wearable camera for sport applications; and Devices to be used for agriculture, such as a camera to monitor a condition of a farm or crops.

The embodiment of the present disclosure is not limited to the above-described embodiment, and various changes can be made without departing from the concept of the present disclosure.

The present disclosure can employ configurations as described below.

(1) A solid-state imaging element including:

a first driving line configured to supply selectively to a posterior stage, a first voltage level that is output from a first power source and a second voltage level that is output from a second power source and lower than the first voltage level;

a second driving line that is different from the first driving line;

a capacitance that is formed between the first driving line and the second driving line; and a floating setting unit configured to set the first driving line to a floating state.

(2) The solid-state imaging element according to (1), in which the first driving line set to the floating state is configured to supply to the posterior stage, a third voltage level between the first voltage level and the second voltage level in accordance with a change in voltage that is supplied to the second driving line by capacitive coupling.

(3) The solid-state imaging element according to (1) or (2), in which the floating setting unit comprises a first switch configured to connect between the first power source and the first driving line, and a second switch configured to connect between the second power source and the first driving line.

(4) The solid-state imaging element according to anyone of (1) to (3), in which the capacitance formed between the first driving line and the second driving line is a parasitic capacitance.

(5) The solid-state imaging element according to anyone of (1) to (4), in which the capacitance formed between the first driving line and the second driving line is an actual capacitance that is formed intentionally.

(6) The solid-state imaging element according to anyone of (1) to (5), in which the first driving line and the second driving line are pixel driving lines that are disposed adjacent to each other in a longitudinal direction.

(7) The solid-state imaging element according to any one of (1) to (5), in which the second driving line is a line dedicated to the capacitive cup link.

(8) The solid-state imaging element according to any one of (1) to (7), in which each of the first driving line and the second driving line comprises a plurality of driving lines.

(9) The solid-state imaging element according to any one of (2) to (8), in which the first driving line is configured to supply any of the first voltage level, the second voltage level, and the third voltage level to a transfer gate electrode in the posterior stage.

(10) A driving method for a solid-state imaging element including a first driving line configured to supply selectively to a posterior stage, a first voltage level that is output from a first power source and a second voltage level that is output from a second power source and lower than the first voltage level, a second driving line that is different from the first driving line, a capacitance that is formed between the first driving line and the second driving line, and a floating setting unit configured to set the first driving line to a floating state, the method including the steps of:

setting the first driving line configured to supply the first voltage level to the posterior stage, to the floating state; and lowering the voltage level to be supplied to the second driving line and supplying a third voltage level between the first voltage level and the second voltage level to the posterior stage from the first driving line by capacitive coupling.

(11) An electronic device including a solid-state imaging element, the solid-state imaging element including:

a first driving line configured to supply selectively to a posterior stage, a first voltage level that is output from a first power source and a second voltage level that is output from a second power source and lower than the first voltage level;

a second driving line that is different from the first driving line;

a capacitance that is formed between the first driving line and the second driving line; and a floating setting unit configured to set the first driving line to a floating state.

REFERENCE SIGNS LIST 11 to 13 Transfer gate electrode
14 to 16 Driving line
22A Switch
23B Switch
24C Coupling driving line
25 Coupling capacitance
26D Switch

The invention claimed is:

1. A solid-state imaging element, comprising:
a first driving line configured to supply selectively to a posterior stage, a first voltage level output from a first power source and a second voltage level output from a second power source, wherein the second voltage level is lower than the first voltage level;
a second driving line different from the first driving line;
a capacitance between the first driving line and the second driving line; and
circuitry configured to set the first driving line to a floating state, wherein
the first driving line set to the floating state is configured to supply a third voltage level to the posterior stage based on a change in voltage supplied to the second driving line by capacitive coupling, and
the third voltage level is between the first voltage level and the second voltage level.

2. The solid-state imaging element according to claim 1, wherein the circuitry comprises:
a first switch configured to connect between the first power source and the first driving line; and
a second switch configured to connect between the second power source and the first driving line.

3. The solid-state imaging element according to claim 1, wherein the capacitance between the first driving line and the second driving line is a parasitic capacitance.

4. The solid-state imaging element according to claim 1, wherein the capacitance between the first driving line and the second driving line is an actual capacitance formed intentionally.

5. The solid-state imaging element according to claim 1, wherein the first driving line and the second driving line are pixel driving lines that are disposed adjacent to each other in a longitudinal direction.

6. The solid-state imaging element according to claim 1, wherein the second driving line is a line dedicated to the capacitive coupling.

7. The solid-state imaging element according to claim 1, wherein each of the first driving line and the second driving line comprises a plurality of driving lines.

8. The solid-state imaging element according to claim 1, wherein the first driving line is further configured to supply one of the first voltage level, the second voltage level, or the third voltage level to a transfer gate electrode in the posterior stage.

9. A driving method for a solid-state imaging element, the method comprising:
setting a first driving line of the solid-state imaging element to a floating state, wherein
the first driving line is configured to supply selectively to a posterior stage, a first voltage level output from a first power source and a second voltage level output from a second power source, and
the second voltage level is lower than the first voltage level;
lowering a third voltage level to be supplied to a second driving line of the solid-state imaging element, wherein
the second driving line is different from the first driving line, and
a capacitance is formed between the first driving line and the second driving line; and
supplying a fourth voltage level to the posterior stage from the first driving line set to the floating state,
wherein the fourth voltage level is supplied to the posterior stage based on a change in voltage supplied to the second driving line by capacitive coupling, and
the fourth voltage level is between the first voltage level and the second voltage level.

10. An electronic device, including:
a solid-state imaging element, the solid-state imaging element comprising:
a first driving line configured to supply selectively to a posterior stage, a first voltage level output from a first power source and a second voltage level output from a second power source, wherein the second voltage level is lower than the first voltage level;
a second driving line different from the first driving line;
a capacitance between the first driving line and the second driving line; and
circuitry configured to set the first driving line to a floating state, wherein
the first driving line set to the floating state is configured to supply a third voltage level to the posterior stage based on a change in voltage supplied to the second driving line by capacitive coupling, and
the third voltage level is between the first voltage level and the second voltage level.

* * * * *